United States Patent [19]
Roze et al.

[11] Patent Number: 6,134,851
[45] Date of Patent: Oct. 24, 2000

[54] ENCAPSULATED WINDOW AND MANUFACTURING PROCESS

[75] Inventors: Jean-Pierre Roze, Compiegne; Pascal Lefevre, Manicamp; Gérard Huchet, Retheuil, all of France

[73] Assignee: Saint-Gobain Vitrage, Courbevoie, France

[21] Appl. No.: 09/125,965

[22] PCT Filed: Dec. 24, 1997

[86] PCT No.: PCT/FR97/02422

§ 371 Date: Feb. 1, 1999

§ 102(e) Date: Feb. 1, 1999

[87] PCT Pub. No.: WO98/29274

PCT Pub. Date: Jul. 9, 1998

[30] Foreign Application Priority Data

Dec. 30, 1996 [FR] France ................................ 96 16184

[51] Int. Cl.⁷ .................................................. E06B 7/00
[52] U.S. Cl. .................. 52/204.597; 52/204.67; 52/208; 296/84.1; 296/90; 296/93; 296/85
[58] Field of Search ................ 52/204.597, 204.67, 52/208; 296/84.1, 90.93, 85

[56] References Cited

U.S. PATENT DOCUMENTS

| | | | |
|---|---|---|---|
| 3,705,470 | 12/1972 | Kent .................................. | 52/204.597 |
| 3,759,004 | 9/1973 | Kent . | |
| 4,765,673 | 8/1988 | Frabotta et al. ...................... | 296/93 |
| 4,787,187 | 11/1988 | Feldmann .......................... | 52/204.597 |
| 4,839,122 | 6/1989 | Weaver .................................. | 264/129 |
| 4,858,988 | 8/1989 | Morgan et al. . | |
| 4,905,432 | 3/1990 | Romie ............................... | 52/204.597 |
| 5,001,876 | 3/1991 | Harper et al. ...................... | 52/204.597 |
| 5,009,462 | 4/1991 | Katcherian ............................ | 296/201 |
| 5,032,444 | 7/1991 | Desir, Sr. ............................... | 428/122 |
| 5,118,157 | 6/1992 | Tamura ............................. | 52/204.597 |
| 5,248,179 | 9/1993 | Biermacher et al. .............. | 52/204.597 |
| 5,264,270 | 11/1993 | Agrawal . | |
| 5,311,711 | 5/1994 | Desir, Sr. . | |
| 5,358,764 | 10/1994 | Roberts et al. ........................ | 428/31 |
| 5,437,131 | 8/1995 | Tamura ................................ | 52/716.6 |
| 5,655,341 | 8/1997 | Jaffiol et al. ....................... | 52/204.54 |
| 6,017,038 | 1/2000 | Wato et al. ........................... | 52/716.8 |

FOREIGN PATENT DOCUMENTS 0 375 577  6/1990  European Pat. Off. .
0 382 602  8/1990  European Pat. Off. .

*Primary Examiner*—Beth A. Stephan
*Assistant Examiner*—Dennis L. Dorsey
*Attorney, Agent, or Firm*—Pennie & Edmonds LLP

[57] ABSTRACT

The invention relates to an encapsulated window comprising a monolithic or laminated glass and/or plastic substrate (4; 14) provided with a frame (5; 16) made of a plastic material which is overmoulded around the periphery of the substrate. The frame includes, along at least part of its periphery, an essentially U-shaped groove which grips the border (6) of the substrate. The plastic material consists of a thermoplastic polymer or a blend of thermoplastic polymers having a flexural modulus of at least 1200 MPa. The frame grips the edge of the substrate with sufficient rigidity so that the edge of the substrate need not be coated with an adhesive primer.

17 Claims, 1 Drawing Sheet

ENCAPSULATED WINDOW AND MANUFACTURING PROCESS

BACKGROUND OF THE INVENTION

The present invention relates to a window, in particular a fixed side window of a transportation vehicle.

Fixed side windows of motor vehicles, in particular those installed to the rear of the vehicle, such as the rear quarter lights, are generally provided, before fitting onto the bodywork, with a trim masking the edge of the window pane.

For a window of given shape, it is possible to fit a prefabricated trim having a frame shape matching the outline of the window and capable, at the expense of slight deformations, of receiving the window pane which is set into housing provided for this purpose. This technique entails quite a number of drawbacks.

In the first place, the clearance inevitably present between the window pane and the prefabricated frame, which is due to their respective manufacturing tolerances, is a source of vibrations when the vehicle is travelling; it is therefore essential to fasten the two components together by adhesive bonding.

Even after adhesive bonding, this clearance results in a variable relative positioning of the frame with respect to the window pane which causes problems when fitting the window into the bodywork, the operator having the choice of favouring either the position of the window pane or the position of the frame with respect to the bodywork opening.

Fitting the window pane using this technique therefore requires a large number of sometimes complicated operations and consequently has a significant labour requirement.

Window panes provided with peripheral frames overmoulded by the injection moulding of a plastic onto the window pane, in particular rear windows of motor vehicles, are also known. Conventionally, the frame consists of an elastomer material, which is either thermoplastic or polymerized in situ using the technique of reaction injection moulding (RIM), in order to fulfil, in addition to its function of protecting the edges of a window pane, a sealing function. In order to remedy the poor adhesion of the usual elastomers to a glass substrate, it is customary, prior to the injection moulding, to deposit around the peripheral region of the window pane a primer coating intended to form an adhesive bond with the elastomer. This additional priming operation entails a non-negligible additional cost in the manufacture of the window pane. Implementation of this expensive overmoulding or encapsulation technique proves not to be competitive for lower-functionality frames, in particular those essentially having a protective or aesthetic function.

SUMMARY OF THE INVENTION

The objective of the invention is to provide a window pane with a peripheral frame without any problem in their relative positioning, in a manner which is simple, reproducible, requires little labour and is relatively inexpensive.

This objective, as well as others which will appear below, is achieved according to the invention by the technique of overmoulding, using, instead of conventional elastomers, a rigid plastic material in order to form a frame which grips the edge of the window pane. Unexpectedly, it has appeared to be quite possible to overmould a rigid plastic onto a window pane without damaging the latter. According to the invention, an adhesive bond is no longer produced between the frame and the window pane, rather a mechanical gripping bond is produced due to the rigidity of the material of which the frame is composed.

In this regard, the subject of the invention is an encapsulated window comprising a monolithic or laminated class and/or plastic substrate provided with a frame made of a plastic material which is overmoulded around the periphery of the substrate, characterized in that the frame includes, along at least part of its periphery, an essentially U-shaped groove which grips the border of the substrate and in that the plastic material consists of a thermoplastic polymer or of a blend of thermoplastic polymers having a flexural modulus of at least 1200 MPa.

BRIEF DESCRIPTION OF THE DRAWINGS

Other advantages and features of the invention will appear in the light of the detailed description which follows, given with regard to the appended drawings, in which.

DETAILED DESCRIPTION OF THE INVENTION

Figure 1:
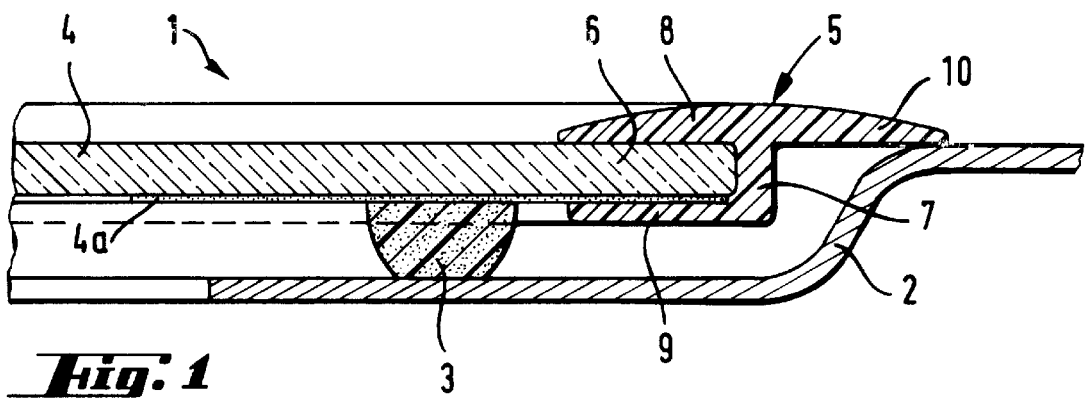
FIG. 1 represents a cross-sectional view of a first window according to the invention.

According to various alternative forms of the invention, the frame may have a continuous longitudinal groove into which the border of the substrate is set around its entire periphery, or else may have only portions provided with a U-shaped groove. The number, position and length of the said portions may be readily determined by the skilled person, depending in particular on the rigidity of the thermoplastic used or on the desired profile for the frame, so as to ensure that the frame is held in place on the substrate. For example, when the thickness of the overmoulded material is relatively small, the frame is relatively flexible and it is preferable to provide segments having a U-shaped groove around the major part of the periphery of the frame in order to avoid any risk of dislodgement. In contrast, a thick overmoulded frame will not be very flexible and satisfactory retention will be achieved even with few of these segments having a groove.

As will be seen below, the windows according to the invention may be provided with frames having a very wide range of cross-sections, having, in particular, in addition to the groove, other parts of defined shape which are intended to give the frame functional components present along its entire length, such as a longitudinal lip or which are limited to certain points or segments on the frame, such as alignment studs or positioning stops.

According to the invention, the overmoulded frame consists of a rigid thermoplastic polymer or a blend of rigid thermoplastic polymers, optionally containing an organic or inorganic filler, characterized by a flexural modulus, measured according to the NFT 51-001 standard, of at least 1200 MPa, preferably of from 1200 to 3000 MPa and most particularly approximately from 2000 to 3000 MPa. In certain embodiments, in which the frame may in particular exert a function of reinforcement of a window pane, the modulus may even reach much higher values.

This rigidity makes it possible, after the overmoulded plastic has cooled, to give the frame a gripping force sufficient to prevent the two legs of the U to move apart and to release the window pane.

Advantageously, the thermoplastic has a Shore D hardness of at least 60 and preferably of from 60 to 90.

It is preferable for the thermoplastic to have a certain volume shrinkage in order to contribute to the gripping. However, this shrinkage must not be too pronounced in order to avoid the window pane breaking due to the effect of the stresses involved. Advantageously, the thermoplastic has a volume shrinkage of approximately from 0.1 to 1%, preferably from 0.1 to 0.8% and in particular approximately from 0.1 to 0.5%.

There are various thermoplastic polymer or polymers which can be used according to the invention. Mention may more particularly be made, as examples, of an unsaturated polyester, a polyamide, in particular nylon-6 or nylon-6,6, a polyolefin such as polypropylene, a rigid polyvinyl chloride, polystyrene, non-elastomeric polyurethane, polyacetal, polycarbonate, polyphenylene oxide, a copolymer of the styrene/acrylonitrile or acrylonitrile/butadiene/styrene type, and blends thereof.

In the window according to the invention, the overmoulded frame is held solidly in place just by the gripping force which is exerted because of its rigidity.

In order to prevent possible retention defects, for example should the material expand significantly due to the effect of heat, it is possible to supplement the mechanical gripping force by a partial adhesive bond between the substrate and the overmoulded frame.

Thus, the invention makes provision for the possible application of an adhesion primer to the edge of the substrate, at least along part of its length, in order to promote adhesion of the overmoulded plastic only on the edge of the substrate. Since this is merely a supplementary measure, it is sufficient to limit the priming to the edge of the substrate. Despite what was said in the preamble, this alternative form remains advantageous as it requires only an approximate application of the primer to the edge of the window pane, contrary to the precise application around the entire marginal region of the substrate in the case of the overmoulding of elastomer materials. The amount of primer composition used in this alternative form of the invention is therefore considerably smaller than in the prior art, and it is furthermore possible to treat several substrates at the same time by applying the primer composition to the edge of an entire stack of window panes. The rate and cost of production are therefore not substantially affected. The primer which can be used according to the invention may be of any known type, in particular a silane-based primer.

As mentioned previously, the overmoulded frame with which the window is provided according to the invention has, in general, a shape matched to the future environment of the window and may, in particular, include various functional components such as, for example, positioning stops or fixing components which can be used for fitting the window into an opening. It may have continuous components present around the entire periphery of the frame, or else components of length limited to a particular segment of the frame resulting from a local modification of the profiled cross-section.

Such functional components may have a shape which protrudes beyond the body of the frame, for example in order to mask the space between the window pane and the bottom of the rebate or a gap in the bodywork. In one advantageous variant, this protruding element has an open structure and may act as a rear-side-panel aerator built into the window.

The functional components may be moulded with the rest of the frame in a mould having a constant cross-section or a suitable variable cross-section, but they may also be carried by inserts incorporated into the thermoplastic injected into the overmoulding mould.

These may also be components attached to the body of the frame after the overmoulding operation, in particular fixed by adhesive bonding. For example, a bead of deformable flexible material may be placed around the perimeter of the moulded frame, which bead, when the window is being fitted into an opening, will be pressed against the bottom of the rebate of the opening. This bead, which is not necessarily continuous or present around the entire perimeter of the frame, is capable of providing at least three advantageous effects; it limits the vibrations of the window in the opening; it reduces the problems of aerodynamic noise; and, when it has a sufficient coefficient of friction on the rebate, it ensures that the window is held in position while the applied adhesive is setting. One material which can advantageously be used as this bead is a polyurethane foam which may be processed in various ways, in particular by the casting, injection moulding or extrusion, onto the frame, of a fluid or viscous material which cures in situ, or else by the bonding of a pre-extruded bead by means of a suitable adhesive.

The presence on this frame of these functional components, such as a shape protruding from the periphery of the window pane, or a component bonding to the opening, is made possible according to the invention by virtue of excellent retention of the frame due to the gripping force exerted by the rigid material overmoulded onto the substrate. A conventional frame, prefabricated by moulding and then fitted onto the substrate, if it were provided with similar components would not be satisfactory since the forces resulting from the interaction of these components with their surrounding would irremediably affect the relatively weak mechanical bond between the frame and this substrate, with as consequence a high risk of dislodging the frame.

The window according to the invention is particularly suitable for many applications in which complete sealing between the window pane and the overmoulded component is not required. Such a window may advantageously constitute a side window for a motor vehicle, fixed into an opening in the bodywork by means of an applied bead of adhesive deposited on the actual glass substrate, the frame simply acting as a trim and sealing between the window and the opening being provided by the bead of adhesive itself.

The rigid thermoplastic used according to the invention can be overmoulded using standard equipment, using the conventional steps: putting the substrate into the mould, closing the mould and applying pressure to it, injection moulding the thermoplastic in the viscous state, and, finally, cooling. A single plastic material may be injection moulded according to the invention, but also several plastics may be used in the technique of coinjection moulding. The invention is also compatible with more complex techniques such as gas-assisted injection moulding (GAIM). According to this process, an inert gas, typically nitrogen, is injected at the same time as the plastic material so as to for a channel, or at least bubbles, in the injected plastic in order to obtain a hollow frame and thus to save a non-negligible amount of plastic. The adjustment of the injection-moulding parameters in GAIM is, however, quite tricky and it frequently happens that the gas bubble comes into contact with the substrate. With elastomers normally used for overmoulding onto glass, this situation results in a loss of adhesion of the frame to the substrate which is highly unfavourable to the integrity of the overmoulded window. This drawback disappears in the present invention since the rigidity of the overmoulded frame compensates for a possible lack of material due to gas-injection defects.

In general, the skilled person will be able to determine, in a manner known per se, the main injection-moulding parameters, taking into account the rheological and mechanical properties of the thermoplastic material. According to the invention, the cooling step is relatively critical since it is during cooling that the plastic starts to exert a gripping force on the border of the substrate. Among the critical parameters, the pressure applied in the mould in this step may advantageously be tailored to each thermoplastic depending on its volume shrinkage during cooling, so as not to subject the overmoulded substrate to stresses which would run the risk of weakening it or even of breaking it. The cooling rate and the temperature gradient in the mould are other parameters to be considered.

In this regard, the invention provides an improved overmoulding (encapsulation) process comprising a step of injection of a thermoplastic material into a mould in which the substrate has been placed beforehand, followed by a cooling step, characterized in that the heat treatment applied to the thermoplastic material during the cooling step is adjusted locally so as to control the volume shrinkage of the thermoplastic at each point on the overmoulded frame.

In particular, the temperature of the mould will advantageously be controlled in the cooling step by providing, for example, cooling channels suitably placed in the mould in order to impose different temperatures, and therefore different degrees of shrinkage, around the perimeter of the frame. In this way, it is possible to create gripping stresses which vary along the frame and thus to adjust the force of the bond between the frame and the substrate at each point on the latter.

The window 1 shown in FIG. 1 is intended to be fixed by adhesive bonding in a rear side panel 2 of a motor vehicle by means of an applied bead of adhesive 3.

It comprises a glass substrate 4 having, on its face turned towards the inside of the bodywork, a preparation layer 4a, such as a layer of opaque enamel, to which the bead of adhesive 3 adheres, and a peripheral frame 5 obtained by overmoulding a rigid thermoplastic material. By way of a particular example of a rigid thermoplastic, mention may be made in particular of a rigid polyvinyl chloride having a flexural modulus (according to the NFT 51-001 standard) of approximately 2000 MPa, a Shore D hardness of approximately 70 degrees and a volume shrinkage of 0.3%. The frame 5 has a part of U-shaped cross-section into which the border 6 of the substrate 4 is set, this U-shaped part defining a longitudinal groove, the bottom 7 and the two side walls 8 and 9 of which are in contact with the border 6. The frame 5 also includes a projecting part 10 in the form of a lip which extends to the outside of the substrate 4 and masks the bottom of the rebate made in the rear side panel 2.

Figure 2:
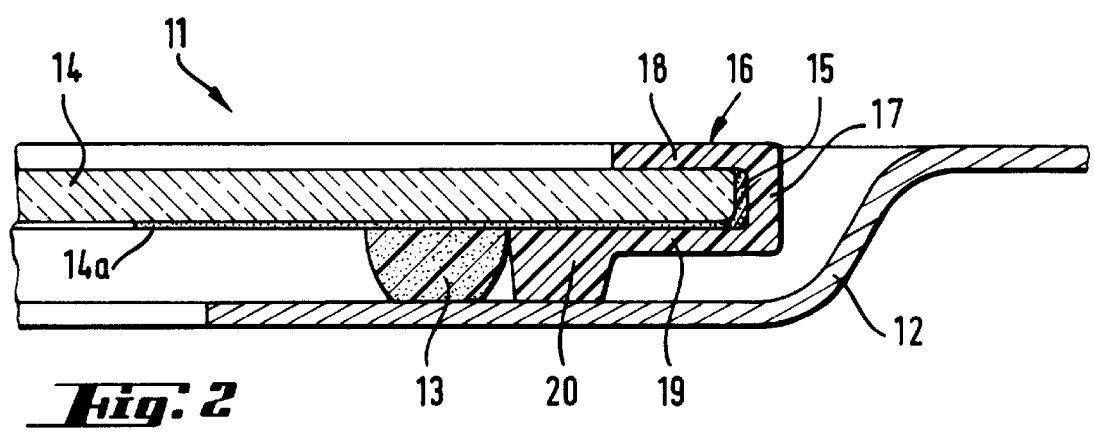
FIG. 2 represents a cross-sectional view of a second window according to the invention.

FIG. 2 shows an alternative form of the invention in which an adhesive bond is made between the frame and the edge of the substrate. The window 11, shown fixed in a rear side panel 12 by means of a bead of adhesive 13, comprises a glass substrate 14 which has an opaque coating 14a around the periphery of its internal face and the edge of the glass substrate is covered with a silane-based preparation primer 15, and a frame 16 whose cross-section has a U-shaped part into which the border of the substrate 14 is set, this U-shaped part defining a longitudinal groove whose bottom 17 is in contact with the layer of primer 15.

While the thermoplastic is being injection moulded in order to form the profile 16, the thermoplastic material chemically interacts with the primer layer applied to the edge of the substrate and an adhesive bond is created between the bottom 17 of the groove and the substrate by means of the layer 15. In contrast, the thermoplastic making up the two side walls 18 and 19 of the U-shaped groove does not interact chemically with the untreated surfaces of the substrate 14 so that, after cooling, the two walls 18 and 19 exert merely a mechanical gripping action on the surfaces of the substrate due to the rigidity of the thermoplastic.

In the alternative form shown in FIG. 2, the profile 16 furthermore includes a longitudinal rib 20 intended to limit the expansion of the applied bead of adhesive 13 used for fixing the window to the rear side panel.

In another alternative embodiment, the rib 20 may be replaced by discrete positioning stops intended to fix the distance between the window 11 and the bodywork.

Figure 3:
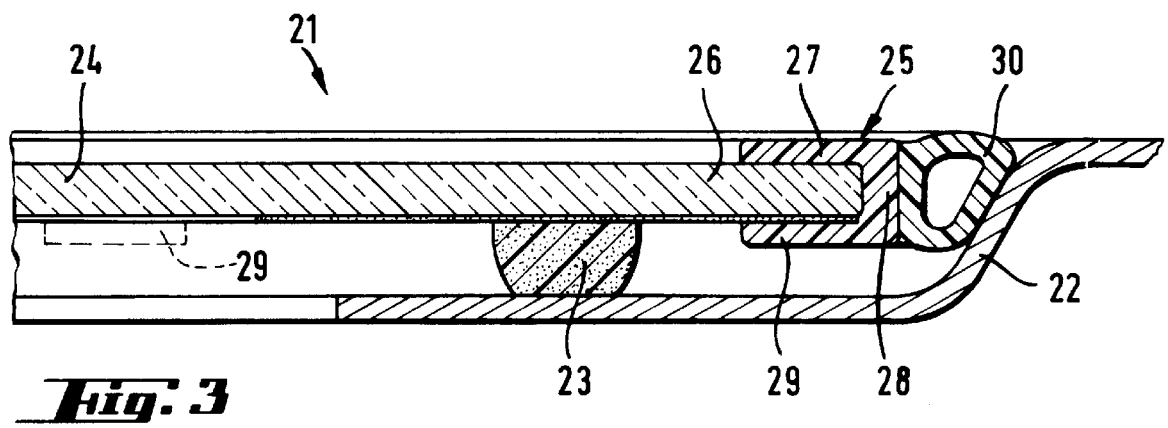
FIG. 3 represents a cross-sectional view of a third window according to the invention.

FIG. 3 illustrates another embodiment of the invention in which the glass substrate is gripped in the frame no longer continuously around its periphery but discontinuously, only at certain segments on the frame.

The window 21, shown as in the previous examples adhesively bonded to a rebate 22 by a bead of adhesive 23, therefore comprises a glass substrate 24 and a frame 25 which extends around the periphery of the substrate 24, alternately covering two and three faces of the marginal region 26 of the latter. The frame 25 thus comprises segments of U-shaped cross-section alternating with segments having an L-shaped cross-section. The section shown in FIG. 3 is produced through a segment having a U-shaped cross-section in which the frame comprises three walls 27, 28, 29 in respective contact with the external face, the edge and the internal face of the glass. Along this segment, the marginal region 26 of the substrate is gripped in the rigid groove formed by these three walls.

The frame part shown to the rear of the plane of section comprises a long segment having two L-shaped walls in contact with the outer face and with the edge of the window pane, and another, shorter segment again having a U-shaped cross-section with a wall 29 in contact with the inner face of the substrate.

The window 21 furthermore includes a flexible bead 30, for example made of polyurethane foam, adhesively bonded to the external face of the wall 28 of the frame 25 and serving to damp the vibrations and the aerodynamic noise when the vehicle provided with the window 21 is travelling. This bead furthermore makes it possible, by virtue of the friction exerted on the rebate 22, to keep the window 21 in place during the setting time of the applied bead of adhesive 23. It will be noted that the frame 25 stays perfectly in place on the substrate 21 both during this application operation and during the subsequent use of the vehicle, despite the forces which will be transmitted to it by the bead 30.

The invention, which has just been described in the case of a window for a motor vehicle, is in no way limited to this embodiment, but is suitable for very many types of window.

What is claimed is:

1. An encapsulated window comprising a substrate (4, 14, 24); and
   a frame (5, 16, 25) made of a plastic material which is overmoulded around the periphery of the substrate; wherein the frame includes, along at least part of its periphery, an essentially U-shaped groove which grips the border (6, 26) of the substrate; and wherein the plastic material has a flexural modulus of at least 1200 MPa.

2. The encapsulated window of claim 1, wherein the plastic material consists of a thermoplastic polymer or a blend of thermoplastic polymers and wherein the plastic material has a flexural modulus of from 1200 to 3000 MPa.

3. The encapsulated window of claim 2 wherein the plastic material has a Shore D hardness of from 60 to 90.

4. The encapsulated window of claim 1, wherein the thermoplastic material has a Shore D hardness of at least 60.

5. Window according to claim 1, wherein the thermoplastic material has a volume shrinkage of from 0.1 to 1%.

6. The encapsulated window of claim 1, wherein the plastic material comprises a thermoplastic polymer selected from the group consisting of polyamide, polypropylene, polyvinyl chloride, polystyrene, an acrylonitrile-butadiene-styrene terpolymer, or blends thereof.

7. Window according to claim 1, wherein the edge of the substrate is at least partly coated with an adhesion primer (15).

8. Window according to claim 1, wherein the overmoulded frame (16, 25) includes at least one functional component (29, 30), in particular a positioning or fixing component which can be used for fitting the window into an opening.

9. Window according to claim 8, wherein the functional component is carried by an insert incorporated into the overmoulded thermoplastic.

10. Window according to claim 8, wherein the functional component is a flexible bead (30) adhesively bonded to the perimeter of the frame (25).

11. The encapsulated window of claim 1 wherein the substrate is a glass monolith.

12. The encapsulated window of claim 1 wherein the substrate is a laminated glass.

13. The encapsulated window of claim 12 wherein the glass is laminated with a second plastic.

14. The encapsulated window of claim 1 wherein the substrate is a second plastic.

15. The encapsulated window of claim 1 wherein the plastic material comprises a plurality of thermoplastic polymers.

16. The encapsulated window of claim 1 wherein the plastic material consists of a thermoplastic polymer or a blend of thermoplastic polymers having a flexural modulus of from 2000 MPa to 3000 MPa.

17. The encapsulated window of claim 16 wherein the plastic material comprises a polyvinyl chloride having a flexural modulus of about 2000 MPa, a Shore D hardness of about 70, and a volume shrinkage on cooling of about 0.3 percent.

* * * * *